2,843,641
POLYMERIZATION PROCESS FOR PRODUCING HEAVY PROPYLENE POLYMERS

Gordon E. Langlois, El Cerrito, and Paul E. Fischer, Concord, Calif., assignors to California Research Corporation, San Francisco, Calif., a corporation of Delaware No Drawing. Application January 3, 1956
Serial No. 556,804

2 Claims. (Cl. 260—683.15)

This invention relates to a process for the production of propylene polymers boiling predominantly in the range of about 425° to 650° F. by the polymerization of propylene in the presence of a propylene tetramer fraction.

Propylene polymer fractions boiling in the range of from about 340° to 420° F. containing a relatively large proportion of $C_{12}$ hydrocarbons, termed "propylene tetramers" in the art, have heretofore been used to a considerable extent as alkylating agents in the production of alkylated aromatic hydrocarbons particularly valuable as starting materials in the production of detergents. However, the detergent produced from such tetramer alkylate has been found to be unsatisfactory in several respects, such as in relatively poor foaming characteristics and excessive caking, and, in order to overcome these defects, it has been necessary to employ expensive additives. Accordingly, it is an object of the present invention to provide a process for the polymerization of propylene to produce a polymer, which, when employed as the alkylating agent in the production of detergents, provides a product having superior detergency qualities and which does not require the inclusion of such additives.

A further and more particular object is to provide a process whereby propylene is polymerized in the presence of a normally liquid material, a substantial proportion of which is propylene tetramer, to produce a polymer product boiling predominantly in the range of from about 425° to 650° F., and particularly in the range of from about 425° to 525° F. Other objects and advantages of the invention will become apparent from the following detailed description thereof.

According to the present process, a propylene-containing, normally gaseous hydrocarbon feed is intimately contacted with a normally liquid, polymer material composed predominantly of propylene tetramer, in the presence of a phosphorous-containing polymerization catalyst at a temperature of from about 175° to 325° F. and pressure of from about 200 to 1800 p. s. i. g. The reaction mix is separated and the net reaction product (the amount of propylene converted to propylene polymer), boiling predominantly in the range of from about 425° to 650° F., is recovered.

In U. S. Patent No. 2,182,617 (Michel), it is disclosed that when propylene is polymerized in the presence of isododecylene ($C_{12}$ polymer), the net reaction product is approximately 100% isononylene ($C_9$ polymer). Thus, the unexpectedness of the present invention, wherein propylene is polymerized in the presence of predominantly propylene tetramer ($C_{12}$) polymers to produce a net product boiling considerably above, and not below, the tetramer component, is readily apparent.

The results which can be realized by the process of the present invention are illustrated by the following examples. In each run, a body of liquid phosphoric acid of the noted concentration was continuously charged to a polymerization reactor which contained mechanical means for vigorously stirring the acid. The propylene-containing normally gaseous feed and the normally liquid, polymer material (from any source, including recycle), composed predominantly of propylene tetramer ($C_{12}$ polymers), were intimately mixed with the acid. The reaction mixture was continuously passed into a settling zone wherein the acid separated as a lower phase and the hydrocarbon as an upper layer. The acid was returned to the reaction zone and the hydrocarbon layer was passed from the settler and fractionally distilled to recover normally gaseous hydrocarbons and the various polymer fractions. The conditions of the reaction and the results of each run are recorded in the following table:

Table I

| Run Number | F-129-A | F-129-B | F-122 | F-117 | F-139 |
|---|---|---|---|---|---|
| Operating Conditions: | | | | | |
| Temperature, °F | 225 | 225 | 225 | 250 | 225 |
| Pressure, p. s. i. g | 700 | 700 | 700 | 700 | 700 |
| Percent $H_3PO_4$ | 116 | 116 | 115 | 116 | 119 |
| Hours Operation | 80–100 | 100–120 | 42–106 | 125–180 | 30–40 |
| Reactor Feed, Parts by Wt.: | | | | | |
| $C_9$ Polymer | 27.2 | 20.6 | 12.45 | 11.4 | 10.7 |
| $C_{12}$ Polymer | 170.0 | 128.5 | 78.0 | 71.3 | 67.2 |
| Reaction Mix, Parts by Wt.: | | | | | |
| $C_9$ Polymer | 27.02 | 20.63 | 12.75 | 11.82 | 10.94 |
| $C_{12}$ Polymer | 169.01 | 128.69 | 79.7 | 73.7 | 68.51 |
| $C_{15+}$ Polymer | 10.48 | 8.85 | 7.1 | 6.28 | 6.48 |
| Net Reaction Product: | | | | | |
| (Wt. Percent Propylene Reacting)— | | | | | |
| $C_9$ Polymer | −1.9 | 0.3 | 3.3 | 4.65 | 2.9 |
| $C_{12}$ Polymer | −10.6 | 2.1 | 18.7 | 26.35 | 16.3 |
| $C_{15+}$ Polymer | 112.5 | 97.6 | 78.0 | 69.0 | 80.8 |
| Wt. Percent $C_{15+}$ Polymer boiling in pentamer range (425° to 525° F.) | 90+ | 90+ | 90+ | 90+ | 75+ |

From the above tabulation it can be seen that the net reaction product (the amount of polymer formed over and above that originally present in the reaction) in all of the runs contained from about 70 to over 100 weight percent of polymer material boiling from about 425° to 650° F. ($C_{15+}$ polymer). Furthermore, it should be noted that, of the $C_{15+}$ polymer produced, over 75 percent, and generally over 90 percent, boiled in the pentamer range of from 425° to 525° F. It has been found that this latter fraction is a more superior alkylating agent in the production of detergents than the propylene tetramer fraction heretofore emrployed commercially, inasmuch as the final product needs no costly additives to improve foam and caking characteristics.

In general, the polymerization reaction is conducted at temperatures of from about 175° to 325° F. and pressures of from about 200 to 1800 p. s. i. g. In respect to the latter, it is preferred that the reaction be operated at a pressure sufficient to maintain the reaction mixture in the liquid phase. The ratio of normally liquid polymer material composed predominantly of propylene tetramer to the propylene contained in the feed (hereinafter referred to as the liquid polymer/propylene ratio) is at least 0.5

(by weight), and preferably in the range of from about 3 to 20.

The present invention provides for the employment of phosphorus-containing polymerization catalysts and, particularly, those containing phosphoric acid of a concentration of from about 110 to 122 percent, calculated as ortho-phosphoric acid. The runs summarized in the above table were conducted according to a preferred method of operation. That is, the reaction was catalyzed by liquid phosphoric acid of a concentration within the preferred range of about 114 to 119 percent, calculated as ortho-phosphoric acid, within the preferred temperature range of from about 200° to 300° F., and at liquid polymer/propylene ratios in the range 3 to 20. However, it must be understood that the present invention can also be practiced with other conventional phosphorus-containing polymerization catalysts, although not with the quality of results that can be realized by liquid acid operations. Thus, the use of the so-called acid film type catalyst wherein the phosphoric acid is disposed as a thin film on an inert, nonporous support such as quartz (as described, for example, in U. S. Patents Nos. 2,135,793 and 2,186,021) is within the scope of the present invention, as is the "solid phosphoric acid" catalyst described in U. S. Patent No. 1,993,513, and the metal pyrophosphate type described, for example, in U. S. Patents Nos. 2,310,161 and 2,414,206. However, in employing both the acid film and solid type catalysts, it is best to operate under slightly higher temperatures and lower equivalent acid concentration than in the liquid phosphoric acid catalyzed operation. For example, good results can be expected with temperatures of from about 275° to 325° F. and $H_3PO_4$ concentrations, calculated as ortho-phosphoric acid, equivalent to about 110 to 114%. Thus, if a reactor feed corresponding to that of run No. F-129-A is fed to a reaction zone at a temperature of about 300° F., a pressure of about 300 p. s. i. g., and a polymer liquid/propylene weight ratio of about 15, and contacted with an acid film or solid phosphoric acid type catalyst of an equivalent concentration of about 110%, about 98% of the propylene will be converted, and of this over 50% will appear as $C_{15+}$ polymers boiling in the range of from about 425° to 650° F.

We claim:

1. A process for producing propylene polymers boiling predominantly in the range of from about 425° to 650° F., which comprises intimately contacting a propylene-containing, normally gaseous hydrocarbon feed and a normally liquid polymer material composed predominantly of propylene tetramer with liquid phosphoric acid of a concentration of from about 110 to 122%, calculated as ortho-phosphoric acid, at a temperature of from about 175° to 325° F., a pressure of from about 200 to 1800 p. s. i. g., and a liquid polymer/propylene weight ratio of from about 3 to 20.

2. The process of claim 1 wherein the acid has a concentration of from about 114 to 119% and wherein the contacting step is conducted at a temperature of from about 200 to 300° F.

References Cited in the file of this patent

UNITED STATES PATENTS

| | | |
|---|---|---|
| 2,592,428 | Kemp et al. | Apr. 8, 1952 |
| 2,622,113 | Hervert | Dec. 12, 1952 |

UNITED STATES PATENT OFFICE

Certificate of Correction

Patent No. 2,843,641

July 15, 1958

Gordon E. Langlois et al.

It is hereby certified that error appears in the printed specification of the above numbered patent requiring correction and that the said Letters Patent should read as corrected below.

Columns 1 and 2, the portion of Table I between the sub-heading "Hours Operation" and the heading "Net Reaction Product" should appear as shown below instead of as in the patent—

| Reactor Feed, Parts by Wt.: | | | | | |
|---|---|---|---|---|---|
| Propylene | 10.5 | 10.5 | 10.5 | 10.5 | 10.5 |
| Propane | 15.6 | 15.6 | 15.6 | 15.6 | 15.6 |
| $C_9$ Polymer | 27.2 | 20.6 | 12.45 | 11.4 | 10.7 |
| $C_{12}$ Polymer | 170.0 | 128.5 | 78.0 | 71.3 | 67.2 |
| Reaction Mix, Parts by Wt.: | | | | | |
| Propylene | 1.2 | 1.43 | 1.4 | 1.4 | 2.47 |
| Propane | 15.6 | 15.6 | 15.6 | 15.6 | 15.6 |
| $C_9$ Polymer | 27.02 | 20.63 | 12.75 | 11.82 | 10.94 |
| $C_{12}$ Polymer | 169.01 | 128.69 | 79.7 | 73.7 | 68.51 |
| $C_{14+}$ Polymer | 10.48 | 8.85 | 7.1 | 6.28 | 6.48 |

Signed and sealed this 11th day of November 1958.

[SEAL]

Attest:
KARL H. AXLINE,
*Attesting Officer.*

ROBERT C. WATSON,
*Commissioner of Patents.*